United States Patent
Michel

(10) Patent No.: US 6,262,360 B1
(45) Date of Patent: Jul. 17, 2001

(54) ELECTRIC CAPACITOR

(75) Inventor: Hartmut Michel, Heidenheim (DE)

(73) Assignee: Epcos AG, Munich (DE)

( * ) Notice: Subject to any disclaimer, the term of this patent is extended or adjusted under 35 U.S.C. 154(b) by 0 days.

(21) Appl. No.: 09/446,422

(22) PCT Filed: Jun. 17, 1998

(86) PCT No.: PCT/DE98/01643

§ 371 Date: Dec. 20, 1999

§ 102(e) Date: Dec. 20, 1999

(87) PCT Pub. No.: WO98/58396

PCT Pub. Date: Dec. 23, 1998

(30) Foreign Application Priority Data

Jun. 18, 1997 (DE) .............................. 197 25 843

(51) Int. Cl.$^7$ .............................. H01L 23/26; H05K 7/20
(52) U.S. Cl. .................. 174/16.3; 174/52.1; 361/707
(58) Field of Search ................. 174/16.2, 52.1; 165/80.2; 361/704, 707, 517, 518, 519, 535, 536, 537, 301.3

(56) References Cited

U.S. PATENT DOCUMENTS 3,686,612 * 8/1972 Clements .
4,670,771 * 6/1987 Neidig et al. .
5,851,337 * 12/1998 Chen .

FOREIGN PATENT DOCUMENTS 43 31 377 A1    9/1993 (DE) .
296 17 888
       U1   10/1996 (DE) .

OTHER PUBLICATIONS

Brochure entitled: "Aluminium–Elektrolyt–Kondensatoren" by Siemens Matsushita Components, 1997.

* cited by examiner

Primary Examiner—Edward H. Tso
(74) Attorney, Agent, or Firm—Schiff Hardin & Waite

(57) ABSTRACT

An electrical capacitor is installed in a housing with a planar housing floor. The capacitor is arranged in a depression of a cooling element. Fastening pins that are guided in bores laterally arranged at the cooling element serve the purpose of fixing the capacitor.

4 Claims, 1 Drawing Sheet

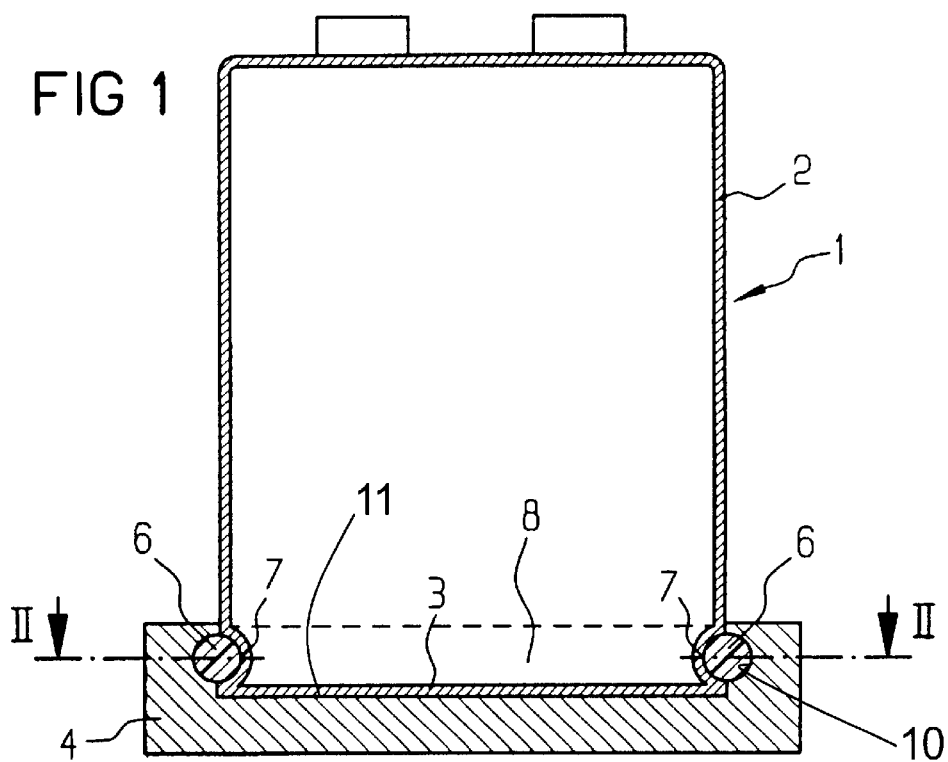
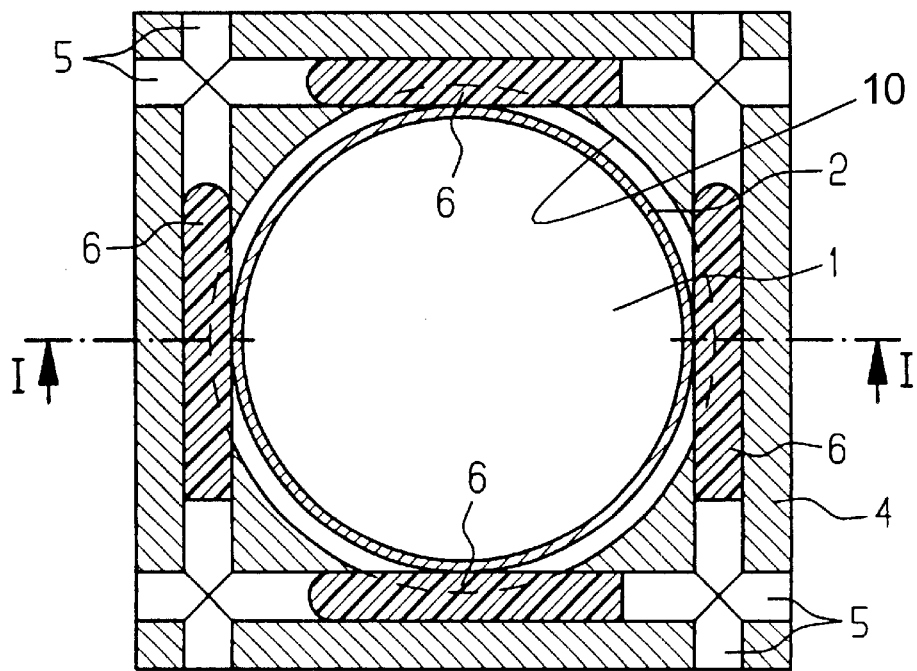

ELECTRIC CAPACITOR

FIELD OF THE INVENTION

The invention is directed to an electrical capacitor, particularly aluminum-electrolyte capacitors for alternating current operation, that is installed in a metallic housing with a planar housing floor, and whereby the housing floor is pressed against a cooling element.

BACKGROUND OF THE INVENTION

Electrolyte capacitors for alternating current installed in metallic housings with planar housing floors which are pressed against a cooling element are known from the Siemens Matsushita Components Data book 1997, "Aluminum-Electrolyte Capacitor", page 146.

When capacitors, particularly aluminum-electrolyte capacitors, are charged with alternating voltage, the ohmic losses lead to an intrinsic heating of the capacitors. This temperature increase limits the maximum alternating current loadability and useful duration of these capacitors.

The alternating current loadability and useful duration can be boosted by a forced cooling of the component, particularly of the cup floor. In order to achieve a good heat elimination, the capacitor floor must lie as durably as possible against the cooling member with form-fit.

A number of measures have been disclosed up to now that only inadequately solve this problem. It is thus known to attach a threaded bolt to the cup floor with whose assistance a fastening to the cooling member ensues. However, it is thereby not assured that the cup floor is also joined with the cooling member in the edge region.

It is also known to undertake fastenings with ring clamps, whereby this fastening, however, can easily undo due to thermal and mechanical loads, so that a durable form-fit connection of cup floor and cooling member is also not achieved here. The aforementioned prior art also discloses a clamp fastening that slightly constricts the cup wall directly above the cup floor and, thus, secures the cup floor at the edge. Although a durable, positive-lock connection of cup floor and cooling member is achieved as a result of this, the known clamp connection has a high space requirement; for example, given a cup diameter of 75 mm, the clamp fastening has an outside diameter of 116 mm.

SUMMARY OF THE INVENTION

It is therefore an object of the invention to durably fix the initially cited capacitor to a fastening element with form fit that has less of a space requirement than the known clamp mechanism.

This object is inventively achieved in that the cooling element has a depression corresponding to the housing circumference, and in that fastening pins that partially project into the depression are arranged at at least two opposite sides of the depression.

A space-saving and durably form-fit fixing of the capacitor on the cooling element is achieved as a result of this integration of the fastening element into the cooling member.

In an embodiment, the present invention provides an electrical capacitor assembly comprising a capacitor disposed in a metallic housing comprising a planar housing floor, a cooling element comprising a depression, the depression having a flat bottom surface, the housing being mateably received in the depression of the cooling element with the planar housing floor of the housing engaging the flat bottom surface of the depression, at least two fastening pins that partially project into the depression on opposing sides of the depression, the fastening pins engaging the housing and pressing the planar housing floor of the housing against the flat bottom surface of the cooling element.

In an embodiment, the cooling element comprises lateral bores that tangentially intersect the depression, each fastening pin being slidably disposed in one of the lateral bores.

In an embodiment, the housing comprises a radially inwardly circumferential groove disposed above the planar housing floor, the depression comprises a radially outwardly circumferential groove disposed above the flat bottom surface, the groove of the housing being aligned with the groove of the depression, the lateral bores tangentially intersecting the groove of the housing and the groove of the depression, the fastening pins engaging the housing at the groove of the housing and clamping the housing downward thereby pressing the planar housing floor against the flat bottom surface.

In an embodiment, the cooling element comprises at least two depressions and the assembly comprises at least two capacitors, the cooling element comprises at least four lateral bores with two lateral bores tangentially intersecting each depression, each fastening pin being slidably disposed in one of the lateral bores.

Other objects and advantages of the present invention will become apparent from reading the following detailed description and appended claims, and upon reference to the accompanying drawings.

BRIEF DESCRIPTION OF THE DRAWING

For a more complete understanding of the invention, reference should now be made to the embodiment illustrated in greater detail in the accompanying drawing and described below by way of an example of the invention.

In the drawing:

FIG. 1 is a side view of a capacitor secured in a cooling element; and

FIG. 2 is a plan view onto the capacitor shown in FIG. 1.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

FIG. 1 shows a capacitor 1 that is installed in a housing 2 having a planar housing floor 3. The housing floor 3 is in form-fit contact with a cooling element 4. A depression 8 whose diameter is based on the diameter of the housing 2 is applied in the cooling element 4.

It can be seen in FIG. 2 that lateral bores 5 are applied in the cooling element 4, these partially projecting into the depression 8. Fastening pins 6 are located in the bores 5, these being pressed into the bores 5 to such an extent that they notch the wall of the housing 2 above the floor 3 at the radially inward groove 7 and are seated in the bores 5 at both sides of the depression 8 at the radially outward groove 10. As a result thereof, the capacitor floor 3 is pressed onto the flat bottom surface 11 of the depression 8 and is thus joined to the cooling element 4 with positive lock.

The fastening pins 6 can be composed of plastic or can also be fashioned as insulated metal pins. Expediently, the fastening pins 6 are provided with a rounded-off tip.

In one exemplary embodiment, an aluminum-electrolyte capacitor having a housing diameter of 76.9 mm is inserted into a depression having a diameter of 77.5 mm and a depth of 5 mm and is secured with plastic pins that are 5 mm thick. The plastic pins notch the cup wall above the cup floor approximately 1.2 mm. Without further forced cooling measures of the cooling element, the thermal outside resistance of the capacitor is reduced to 20% by the cooling element. The entire fastening, including the cooling member, has an edge length of 90 mm.

When the cooling member is equipped with a plurality of capacitors that are arranged in a capacitor battery, the depressions can be arranged such that one pin notches two capacitors, so that the edge length can be reduced by a further 8 mm per capacitor pair.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. An electrical capacitor assembly comprising:
    a capacitor disposed in a metallic housing comprising a planar housing floor,
    a cooling element comprising a depression, the depression having a flat bottom surface, the housing being mateably received in the depression of the cooling element with the planar housing floor of the housing engaging the flat bottom surface of the depression,
    at least two fastening pins that partially project into the depression on opposing sides of the depression, the fastening pins engaging the housing and pressing the planar housing floor of the housing against the flat bottom surface of the cooling element.

2. The assembly of claim 1 wherein the cooling element comprises lateral bores that tangentially intersect the depression, each fastening pin being slidably disposed in one of the lateral bores.

3. The assembly of claim 2 wherein the housing comprises a radially inwardly circumferential groove disposed above the planar housing floor, the depression comprises a radially outwardly circumferential groove disposed above the flat bottom surface, the groove of the housing being aligned with the groove of the depression, the lateral bores tangentially intersecting the groove of the housing and the groove of the depression, the fastening pins engaging the housing at the groove of the housing and clamping the housing downward thereby pressing the planar housing floor against the flat bottom surface.

4. The assembly of claim 1 wherein the cooling element comprises at least two depressions and the assembly comprises at least two capacitors, the cooling element comprises at least four lateral bores with two lateral bores tangentially intersecting each depression, each fastening pin being slidably disposed in one of the lateral bores.

* * * * *